United States Patent Office 2,957,804
Patented Oct. 25, 1960

2,957,804
PESTICIDE

Harlan R. Shuyler, 123 E. 51st Terrace, Kansas City, Mo.

No Drawing. Filed June 6, 1958, Ser. No. 740,197

24 Claims. (Cl. 167—46)

This invention relates to the killing, reduction, control and extermination of various types of vertebrate animal pests, and more particularly to the provision of a novel pesticide which is adapted for the effective killing of certain pests, even with the utilization of economic poisons which have not heretofore proven as effective as desired in prior as well as current usage.

As is well known, a great need exists for a method of satisfactorily and economically bringing under control, rodents such as rats and mice, and other pests including harmful bird species. Rodents, which have now spread to all parts of the country, are considered major economic pests as it has only recently been estimated that just the rats which occur in and around man's structures cause a loss of over one billion dollars per year in the United States alone. Since these animals are for the most part omnivorous, the damage to food is distributed throughout the food industries from source to consumer, such damage including great property destruction and general contamination. From the standpoint of health, rodents are also a great menace because they are vectors, either directly or indirectly, of many diseases; they have ectoparasites which attack man, and they are capable of inflicting severe bites on human beings. Professional pest control operators, government officials concerned with rodent control, public health officers, sanitation engineers, farmers, food handling and processing establishments, and home owners and tenants have tried for a long period of time, with little or no success, to bring rodent pests under control. The employment of poisoned baits has proven to be the most effective method of abating pests in the nature of vertebrate animals such as rodents, but previous poisoned materials utilized have had serious inherent disadvantages because the rodents or other pests consumed only sub-lethal doses and were not killed by the poison and thus, subsequently refused to take poisoned baits containing certain types of otherwise effective economic poisons and consequently the overall effectiveness of the bait method was seriously curtailed. An improved pesticide has now been discovered which completely revolutionizes rat and mice exterminating methods and presents an entirely new concept in the field of rodent control.

In addition, certain species of birds, particularly pigeons, English sparrows and starlings have gradually become a great pest to mankind. In both urban and rural situations, these birds deface buildings, increase maintenance costs due to decay, encourage the spread of ectoparasites, eat grains and cereals, spread diseases such as psittacosis and Salmonella food poisoning organisms, and contaminate with their feces, dropping feathers, and through other unsanitary habits, great quantities of foodstuffs. Birds cause even more damage to grain in storage than is ruined by rats and mice. The most economical method of reduction of bird populations known to date is the method of poisoning, but one of the deterrents to widespread poisoning procedures today is the relatively unpredictable results which occur when current poisoning techniques are employed, such unpredictable results being primarily attributable to the fact that the birds sometimes consume sub-lethal doses and thus refuse thereafter to take baits containing the same type or similar types of otherwise effective poisonous substances. The present pesticide and method of killing pests in the nature of birds completely overcomes this problem and thereby presents an economical and satisfactory method of controlling these types of pests.

More specifically, the instant pesticide may be a laminated, self-sustaining body comprising the combination of (1) an economic poison completely enveloped within an enteric coating, (2) such poison coated with an emitting agent, (3) a quantity of poison surrounded with successive layers of an enteric coating and then an emitting agent or (4) poison enveloped in successive coatings of an enteric material, an emitting agent and a water insoluble layer. A pesticide made according to the principles that have now been discovered preferably comprises a relatively small, spherical mass which is made up of at least two layers, each arranged in a specific order to perform a designated function leading to the overall result. A self-sustaining mass or spherical pellet produced in accordance with the first form designated above has a central portion including a predetermined lethal quantity of an economic poison, and with the internal poison nucleus in turn being enclosed within and surrounded by an enteric coating.

The second type of pellet may comprise a predetermined quantity of an economic poison enveloped within a layer of an emetic disposed in completely surrounding, sealing relationship to the poison. The third type of pellet would be of laminated construction with a layer of an enteric coating being provided between the poison nucleus and the emetic. The fourth pellet would be any one of the three pellets designated above but having an outer water and saliva insoluble, relatively tasteless layer thereover in protecting, sealing relationship to the materials.

The problem of killing rodents such as rats and mice has presented peculiar, heretofore unsolved difficulties, principally because of the living habits of these pestiferous vermin and the fact that they must be trapped or baited with poison or the like. The animals sought to be destroyed are extremely hardy, especially the so-called "wild" variety, and have a high reproductivity ratio so that even when substantially all of a population are destroyed, the survivors reproduce at a rate such that the particular area again becomes infested within a short time. Although the average longevity of rats is only four to six months, many have been known to live as long as four years and each female rat is capable of producing three to eight litters per year, averaging six animals per litter. Also, since these noxious pests live in the ground or hidden areas of buildings, they cannot be combated openly but annihilation methods must depend principally on entrapment or poison baiting.

With respect to poisoned baiting, which has been found to be the most effective control, reduction and extermination method, there are certain problems incident to use of the poisons which make the method difficult in actual application, as well as making various procedures completely impractical and of no avail when their employment would, in fact, otherwise be of advantage. More specifically, it has been current practice to place poisoned baits only in those areas where the baits are relatively inaccessible to domestic animals and humans, to thereby maintain a necessary safety factor in utilization of the poisoned materials. However, this safety precaution has necessitated placement of the baits in areas where they are not completely effective in luring the rodents or other pests into consuming such baits and therefore, the most advantageous theoretical possible results of the poisoned bait control procedures have not been fully exploited.

For example, safety factors relating to accidental ingestion of poisoned baits currently in use by domestic animals and/or humans is one of the major problems facing those engaged in pest control activities today. As heretofore noted, since it is necessary to distribute poisoned baits in areas where domestic animals and humans may accidentally ingest the poisons, there is a constant danger that persons or valuable animals may accidentally receive some of the poison intended for the rodents or other pests. There is particular danger from household use of these poisonous substances because of the fact that small children do not understand the potentiality of the killing agent and are therefore likely to consume some of the same without realizing the danger.

The results obtained by the use of poisoned baits currently in use are extremely variable. This variability has been attributed as primarily due to various factors associated with the rodenticidal poisoning agents, especially those affecting the acceptability of baits to rodents. These reports of variable results of poisoned baits persist even with the use of the relatively tasteless, slow action, multiple-dose anticoagulant poisons such as warfarin. Even the current widespread use of anticoagulant poisons, with their relatively high efficiency and safety, have not materially reduced the rodent problem, apparently because of the decrease in effectiveness with prolonged usage. In other words, the current increase of rats may be because of the fact that the rodents which are easy to kill have been killed.

Research has been conducted to determine the cause of such extreme variability of results with poisoned baits against rodents. Various investigators in the rat and mouse control field have determined that there are at least two basic "shyness" conditions exhibited by these vermin with respect to poisoned baits. One such shyness is referred to as "bait refusal," wherein it has been found that the rats are capable of very early detection of the harmful effects of the bait and therefore will not, under any circumstances, partake of lethal quantities of such bait. The exact reasons why the rats are able to detect the harmful bait are not presently known but it is believed that the bait refusal is predicated upon many factors, including actual detection of the odor of the poison, early warning by or death of the "official tasters" (dominant members) of the rodent colony, thus causing the remaining members to shy away from the bait, and even some indications that the population refuses to take bait when a number of their members have succumbed to the particular poison employed.

Another type of reticence has been termed "bait shyness," wherein the rodent's refusal to accept a poisoned bait has been found to be associated with its having been subjected to a sub-lethal dose. In other words, when a rat or mouse accepts a bait containing a poison, but only receives a sufficient amount of the poison to make it sick or conscious of a deleterious effect and insufficient to cause death, the rat or mouse will thereafter completely refuse to take poisoned bait but, immediately upon detection of the recognized taste thereof, will spit the bait out and thereafter refuse to take poisoned bait. This refusal may continue for one month and has been known to last for as long as a year. In many instances it is believed the rat actually can detect the poison by the odor thereof without even taking the bait in its mouth.

Bait shyness, as discussed above, is a type of behavior which is exhibited in three different manners and animals which evidence this behavior are said to have bait base shyness, poison shyness, or poisoned bait shyness. The type of association known as "bait base shyness' is one in which the sub-lethal dose causes the rat to associate the poisonous effect with the taste of the food and therefore, it will no longer take a bait having that food therein, regardless of the type of poison employed. In this type of shyness, it can be seen that many of the most lucrative baits are no longer of any value no matter what poison is employed, because the rat population has become shy to the base.

Another type of "bait shyness" has been termed "poison shyness," wherein the rodent actually develops an association between some physical characteristic of the poison such as taste, odor or texture and the sub-lethal effects of that poison, and will not take any bait containing that particular poison.

"Poisoned bait shyness," the third aspect of bait shyness, has been found in some populations and in this type of association, the vermin will refuse a bait containing the same food base and the same poison that he contacted earlier when a sub-lethal dose was taken. In this association, the rat refuses the bait because it is the same food and the same poison as theretofore consumed. "Poisoned bait shyness" generally is exhibited as the strongest form of bait shyness, apparently due to the total association of food and poison will ill effects reinforcing and strengthening the force of association of either food or poison alone.

Mice have a habit of being "nibblers." They take only a very little bit of food at a time and feed many times at many different places during a 24-hour period. This habit of mice causes most attempts to poison mice to fail, as they do not ingest sufficient poison bait at any one time to cause death. It has proven difficult, indeed, almost impossible, to find poisons which will be accepted by mice in such concentrations that a single nibble will cause death of the animals.

It is of particular note in respect to the above set forth conditions of shyness that animals such as rats and mice have an extremely keen sense of poison detection, much greater than in humans, and therefore these instances of population refusal are extremely important in attempting to annihilate an entire colony.

It is, therefore, the most important object of this invention to provide a pesticide material which is adapted to overcome the above enumerated difficulties regarding bait acceptability.

An equally important object of this invention is to provide a pesticide which provides a greater safety margin if accidentally ingested by humans or domestic animals, such as dogs, cats and hogs, than heretofore known and utilized poisoned baits.

Another important object of this invention is to provide one type of a pesticide which is adapted to selectively kill various types of pests but is harmless to humans and other mamals in the nature of dogs, cats and hogs.

Also an important object of the instant invention is to provide such a pesticide as referred to above containing an enteric coating completely enveloping the poisonous principle, so that if the pesticide is accidentally consumed by humans or domestic animals, a greatly increased time interval is provided for the victim to receive necessary medical treatment by a physician or veterinarian, before the poisonous principle begins its toxic action.

Also an important object hereof is to provide such a pesticide as referred to above containing an emetic completely enveloping the poisonous principle, so that if the pesticide is accidentally consumed by a mammal other than rodents, the emetic will cause regurgitation before the poisonous material can have any deleterious effects.

A further object of this invention is to provide a pesticide including an emetic coating over the poisonous principle, wherein an intermediate enteric coating is disposed between the emetic and the poison, so that the poison will always pass into the intestine before the killing effect takes place.

A further, equally important object of this invention relates to the provision of an outermost water and saliva insoluble, tasteless layer enveloping the enteric coating or the emetic as the case may be so that the pest cannot taste the emetic or enteric coating material during ingestion of the pesticide, to thereby preclude possible development of shyness against such materials. In this respect, another important object of the invention is to provide an outer water and saliva insoluble layer covering the emetic or enteric coating so that the pesticide pellet may be utilized in moist, crumbly baits as well as dry baits.

Other very important objects of the invention relate to the provision of a laminated, self-sustaining pesticide pellet as alluded to above, of an appropriate size proximating 0.03 inch in diameter in the case of rodents so that the pests taking the poisoned bait cannot or will not chew the same; to the provision of a pesticide pellet of spherical configuration proximating the size set forth above so that the sharp, pointed incisor teeth of the pests, such as rodents, will not tend to break the mass, thereby causing the pesticide to pass down into the stomachs of the animals without being chewed; to incorporation in or on the outermost coating of the pesticide pellet of various types of odoriferous and taste attractants, thus causing the vermin to more readily take the bait and allowing the use of the pesticide with or without incorporation of the pellets in other bait materials; to the provision in or on the outermost coating of the pellet of a distinctive color whereby humans will be warned of the poisonous characteristics of the material and the pests will be attracted to the poisoned baits; to the provision of a pesticide wherein the quantity or effective dosage of the economic poison in each pellet is carefully controlled so that there will always be present an approximate lethal dose (or given multiple or fraction thereof) contained within the pesticide to kill an individual of median weight of the particular pest species, or to produce a predictable lethal effect upon a certain percentage of that species; to the provision of a pesticide wherein the ratio of emetic to poison is carefully controlled so that there will always be sufficient emetic to counteract the particular lethal dose present; and other important objects which will be described or become obvious as the following specification progresses.

In order to counteract the various types of shyness which have been described hereinabove, it has now been found that by constructing a pellet in a manner to be outlined, these problems are completely overcome. The pesticide pellet is preferably of laminated characteristics and self-sustaining so that it may be incorporated into the various types of dry and moist baits. The pellet is most desirably manufactured in spherical form so that the center thereof constitutes the poison or active principle, there being an enteric coating surrounding and completely enclosing the poison, an emetic layer enveloping the enteric coating and an outermost water and saliva insoluble, tasteless layer around and enclosing the emetic coating. It is thus manifest that there is presented a spherical pellet preferably having at least four individual layers, each of which performs its important cooperative function.

As indicated, one of the main problems to be solved in overcoming rodent shyness is the fact that the rats, for example, taste the poison during consumption thereof and either refuse to take the bait or if only a sub-lethal dose is taken in, some form of bait shyness may develop. It is therefore to be perceived that means must be provided so that the rat in taking the bait does not taste the poison in any way. This, of course, presents peculiar difficulties, because rats most nearly always chew up their food before swallowing the same and thus the poisonous material must be of such character that it is not chewed by the rat before passage to the stomach. In this respect it has now been determined that if the poisonous bait is sufficiently small, the material will pass down the throat of the rat or mouse without being chewed. Because of the fact that rodents have very sharp, pointed incisor teeth which do not intermesh in the same manner as other types of mammals, small, rounded objects will slide off or between the teeth in such a manner as not to be crushed thereby, thus making it relatively impossible for the rodent to spit the same out. When bait particles are sufficiently small, rats tend to gulp one or more bites at the point of bait placement, then scurry to better shelter, returning later to hurriedly take one or more bites. If the particles are larger than this optimum, they tend to grasp an overflowing mouthful, return rapidly to shelter, hoard it and then chew it at their leisure. Thus it is apparent that if a small enough pellet can be provided, the rat will swallow the same without chewing it up prior to passage down the esophagus. Determinations indicate that the poisonous particle should be spherical, as indicated, and have a diameter such that the pellets will pass through a screen of 16 to 20 mesh inclusive. It is, of course, pointed out that this size is not critical and that deviations may be made therefrom in either direction, but the preferred size will pass through the designated screens. The problem encountered in this respect, however, is concerned with the fact that even though the pesticide particles are sufficiently small so that the rat or mouse will not chew the same, the rat will spit the same out if it tastes the poison or a shyness has developed in a manner as heretofore described. In order to obviate this difficulty various specialized coatings may be provided over the poison so that there will be no taste associated therewith which would tend to cause the rat to spit the bait out and thus be of no killing value. It can be seen that the pellets, by their very nature, being of an appropriate size and preferably only about 0.03 inch in diameter for utilization in the killing of rats and mice, must contain a poison which is relatively potent if results are to be achieved in a short period of time as of the order of overnight, and each pellet should be capable of killing the rodent to which it is offered or the pellets should be capable of giving a predictable percentage of kill of the population if each animal should consume only one pellet.

In order to determine what amounts of poisons should be included for essentially ideal performance it is necessary to follow some guides. First, it is usually considered that an average size rat will not exceed 250 grams in weight. Dosages of rat poisons are customarily measured in terms of milligrams of poison per kilogram of rat body weight (mg./kg.). Toxicities of poison are generally designated in terms of averages of lethal dosages, known as LD, and the accepted standard of measuring potential effectiveness is usually set as $LD_{50}$. This is a measure used to indicate that, on the average, out of every 100 rats subjected to a particular quantity of a given poison in proportion to a given weight of animals, 50% of the animals will succumb. The given poison is then said to have a toxicity such that the $LD_{50}$ is equal to the particular quantity of poison, in mg./kg., that is required to kill half of the animals of a given population. The numerical ratio indicating the quantitative relationship of the toxic product (in mg./kg.) present for, or consumed by, a given animal to the amount of that toxicant determined to be an $LD_{50}$ for that species is referred to as the number of $LD_{50}$ units. In the instant pesticide pellet it is preferred that each sphere contain at least one $LD_{50}$ unit for a 250 gram rat of the least susceptible sex, so that if an average size rat takes at least one of the poisonous objects, there is at least a 50–50 chance of its being killed.

In actual practice it has been ascertained that average size adult rats will take approximately 0.85 gm. of bait with each mouthful. Therefore, it is desirable that a sufficient number of the pesticide pellets of approximately the designated size be incorporated into the bait, so that there will be at least one pellet for every 0.85 gm. of bait and thus make it substantially certain that the rat will obtain at least one pellet with each mouthful of food. Most baits are provided in either moist or granulated form and, although the moist baits are in most instances preferable because the rodents tend to take them more readily, from a commercial and practical standpoint the baits are usually employed in dry form. In this dry form, there is no tendency for the bait to dry out as is incident in moist baits, thus leading to molding, decay and the like. Care must be exercised in the preparation of dry baits, however, because if the bait is too dusty, the dust will rise in the nostrils of the animals as well as their throats and cause them to shy away from the bait. On the other hand, if the particles of bait are too large, the animals tend to hoard the same instead of partaking thereof at the point where the bait is located. This hoarding is deleterious to the killing effect, because it has been found that less than 10% of all food hoarded by rats and mice are thereafter eaten and the effected kill would be substantially lowered. When the particles of bait and the pesticide are maintained within the size limits set forth herein, however, there is less tendency for the rats to hoard and more partaking of the bait at the point of placement.

Because of the fact that it is preferable to maintain the pellets within the prescribed size limit, approximately 0.03 inch in diameter, relatively potent killing agents must be employed as set forth above and inasmuch as it is desirable to provide a spherical pellet, the poison should be compressible into a small, round, tablet of the designated size. Among the various poisons which are operable in the instant pesticide and are compressible into the preferred form are the examples set forth hereinbelow.

For purposes of clarity the tablet having a nucleus of poison surrounded only by an enteric coating will be described in detail first. Thus, the innermost spherical nucleus of poison is surrounded by an enteric substance completely enveloping the poisonous material so that such poison is not contacted in any manner by the atmosphere. This enteric substance will not be dissolved in the stomach of the rodent but passes to the intestine before dissolving. Many well known enteric substances are utilizable in forming the layer over the poison and in this respect it is preferable that the material be insoluble in the acidic condition found in the stomach but soluble in the alkaline environment present in the intestine, although other materials having time delay characteristics could be employed, that is, those which in operation do not completely dissolve in the stomach, but do finally dissolve in the intestine. In the case of enteric coatings having time delay characteristics, it is preferable that the materials used and the thickness of the coating be adjusted, as understood by those skilled in this art, so that the time delay within the stomach be approximately six hours. By utilization of an enteric coating which has an inherent six hour time delay characteristic, the maximum practical time is allowed to prevent any of the poison becoming available in the stomach of the pest to cause bait shyness in the event of sublethal dosage. Similarly, the stipulated six hour time delay permits the most practical time period for proper medical treatment to be rendered by a physician or veterinarian in cases of known accidental ingestion by humans or domestic animals such as dogs, cats or hogs.

The preferred material is one which has a maximum insolubility very near that of the pH of the stomach (e.g., glycerol esters of fatty acids). Any of the materials which gel and dissolve by a change in pH or which would not dissolve within the time period necessary for the material to pass to the intestine are operable, such as various types of resins including acrylamide; the polyamides, which are hydrolyzed in the intestine but not in the stomach; the high melting fats such as the glycerol esters of fatty acids; esters or polyesters which have been esterified with high weight alcohols; gelatin which has been partially denatured with formaldehyde, the denaturing being proportioned upon the degree of hardness desired; polysaccharides such as starches; and certain proteins which are known in the art to have their maximum isoelectric point at the pH of the stomach.

The importance of the enteric coating completely enveloping the poison nucleus is readily apparent from the foregoing description because of the fact that the amount of poison in each sphere or pellet is proportioned so that there is preferably at least one $LD_{50}$ unit of the economic poison to assure a predictable rate of killing but, if a larger than average rat consumed only one of the pellets, there is no likelihood of the rodent becoming shy to the particular bait or poison because of the sublethal dose to which the same was subjected. Thus, the pest will not be subjected to the effects of the poisonous material until the pellet has passed through the stomach into the intestine and the probability of such animal developing a shyness condition is completely obviated. As heretofore noted, rodents and other pests have a very keen sense of poison detection in the mouth and stomach and it is undesirable that the rodent receive such sublethal dose of poison in the stomach, because there is a much greater chance of the rat or mouse becoming sensitive to the particular poison and/or the bait base, so that subsequent refusal or shyness will develop. However, if the poisonous material is not released until the pellet has passed into the intestine, the tendency of shyness will, for the most part, be eliminated, if apparent at all, as there are few, if any, sensory nerve endings in the intestine.

As many economic poisons and enteric coatings are utilizable in producing a pesticide having the desired characteristics, the most important poisons and enteric coating compositions are set forth in the folowing tables. The preferred amounts of rodenticide per pellet as well as the approximate amount or thicknesses of the particular coating necessary to achieve the desired objects stipulated are set forth. In addition, certain of the examples disclose an outer water and saliva insoluble, tasteless layer over the enteric coating with preferred thicknesses or amounts of such outer layer being stipulated in the following tables.

Table A

| | Units of Pesticide per Pellet |
|---|---|
| Pesticide: | |
| Arsenic trioxide ($As_2O_3$) | 6.25 mg. (½ $LD_{50}$ unit). |
| Strychnine alkaloid | 2.5 mg. (1 $LD_{50}$ unit). |
| Strychnine sulfate | 3.0 mg. (1 $LD_{50}$ unit). |
| Sodium monofluoroacetate (1080) | 1.25 mg. (1 $LD_{50}$ unit). |
| Red Squill ("Silmurine" brand) (27 mg./kg.) | 6.75 mg. (1 $LD_{50}$ unit). |
| Red Squill (100 mg./kg.) | 6.25 mg. (¼ $LD_{50}$ unit). |
| Alpha naphthyl thiourea (ANTU) | 2 mg. (1 $LD_{50}$ unit) |
| "Castrix" (2-chloro, 4-dimethylamino, 6-dimethylamino, 6-methyl pyrimidine). | 0.65 mg. (1 $LD_{50}$ unit). |
| DAS (p-di methylaminobenzenediazo sodium sulfonate). | 3.75 mg. (1 $LD_{50}$ unit). |
| Zinc phosphide ($Zn_3P_2$) | 10 mg. (1 $LD_{50}$ unit). |
| Phosphorus (yellow) | 2.5 mg. (1 $LD_{50}$ unit). |
| Thallium sulphate (Thallous sulfate) $Tl_2SO_4$ | 6.25 mg. (1 $LD_{50}$ unit). |
| Anticoagulant rodenticide: | |
| Warfarin (3-(a-acetonylbenzyl)-4-hydroxy-coumarin). | 0.625 mg. (daily dose for 1 $LD_{50}$ unit in 3 to 5 days). |
| Coumachlor (3-(alpha-acetonyl-4-chlorobenzyl)-4-hydroxy-coumarin). | Do. |
| "Fumarin" (3-(alpha-acetonyl-furfuryl)-4-hydroxy-coumarin). | Do. |
| "Pival" (2 Pivalyl-1,3-indandione) | Do. |
| Dicoumarol (3,3-methylenebis (4-hydroxy-coumarin)). | Do. |
| Diphacinone (2 diphenyl-1,3 indandione) | Do. |
| Calcium salt of 2-isovaleryl-1, 3-indandione | Do. |

Table B

[Enteric coating compositions for enclosing any of the pesticides set forth in Table A. These enteric compositions are to be applied in conjunction with suitable dusting powders]

Example 1: Parts by weight

| | |
|---|---|
| Stearic acid | 8 |
| Mutton tallow | 6 |
| Balsam tolu | 2 |
| Iron bile salts | 1 |

20 to 30 coats applied to give coating 0.13 to 0.46 mm. thick with preferred coating being approximately 0.25 mm. in thickness.

Example 2:

| | |
|---|---|
| Stearic acid | 8 |
| Mutton tallow | 6 |
| Balsam tolu | 2 |
| Sodium taurochloate (65%) | 1 |

20 to 30 coats applied to give coating 0.13 to 0.46 mm. thick with preferred coating being approximately 0.25 mm. in thickness.

Example 3:

| | |
|---|---|
| Shellac (as free) | 6 |
| Ethyl alcohol (anhydrous denatured) | 6.7 |

10 to 12 coats applied.

Example 4: Parts by weight

| | |
|---|---|
| Shellac (as free) | 4 |
| Ethyl alcohol (anhydrous denatured) | 6.7 |

14 to 18 coats applied.

Example 5:

| | |
|---|---|
| Shellac (as free) | 6 |
| Eethyl alcohol (anhydrous denatured) | 6.7 |
| Castor oil | 0.44 |

10 to 14 coats applied.

Example 6:

| | |
|---|---|
| Shellac (as free) | 3 |
| Gum sandarac | 3 |
| Ethyl alcohol (anhydrous denatured) | 6.7 |

8 to 10 coats applied.

Example 7:

| | |
|---|---|
| Shellac (as free) | 3 |
| Gum sandarac | 3 |
| Ethyl alcohol (anhydrous denatured) | 6.7 |
| Castor oil | 0.44 |

8 to 12 coats applied.

Example 8:

| | |
|---|---|
| A. Cetyl alcohol | 9 |
| Gum sandarac | 24 |
| Ethyl alcohol (anhydrous denatured) | 40 |
| B. Balsam tolu | 25 |
| Acetone | 12.5 |

5 coatings each of A and B applied in alternate order.

Example 9:

| | |
|---|---|
| Cellulose acetate phthalate | 5 |
| Ethyl acetate | 47.5 |
| Ethyl alcohol (anhydrous denatured) | 47.5 |

16 to 20 coats applied.

Example 10:

| | Range, parts by weight | Preferred, parts by weight |
|---|---|---|
| Myristic acid | 48 to 88 | 68 |
| Castor oil (hydrogenated) | 5 to 45 | 25 |
| Castor oil | 1 to 3 | 2 |
| Cholesterol | 0.5 to 2 | 1 |
| Sodium taurocholate | 3 to 5 | 4 |

14 to 18 coats applied.

Example 11: Parts by weight

| | |
|---|---|
| Stearic acid | 7.5 |
| Carnauba wax | 2.5 |
| Petroleum jelly | 0.18 |

12 to 16 coats applied.

Example 12:

Cellulose nitrate lacquer.

16 to 20 coats applied.

Example 13:

| | | |
|---|---|---|
| Stearic acid | pounds | 2 |
| Castor oil | do | 0.5 |
| Shellac glaze (as free) | gallons | 1 |

12 to 16 coats applied.

Example 14:

Mono glycerol ester of stearic acid in suitable solvent.

10 to 14 coats applied.

*Table C*

[Water insoluble coating compositions for enclosing any of the pesticides set forth in Table A when coated with certain of the compositions listed in Table B. These water insoluble compositions are to be applied in conjunction with suitable dusting powders]

Example 1: Parts by weight

| | |
|---|---|
| Shellac (as free) | 6 |
| Ethyl alcohol (anhydrous denatured) | 6.7 |

1 to 2 coats applied.

Example 2:

| | |
|---|---|
| Shellac (as free) | 4 |
| Ethyl alcohol (anhydrous denatured) | 6.7 |

2 to 4 coats applied.

Example 3:

| | |
|---|---|
| Shellac (as free) | 6 |
| Ethyl alcohol (anhydrous denatured) | 6.7 |
| Castor oil | 0.44 |

2 to 3 coats applied.

Example 4:

| | | |
|---|---|---|
| A. Heavy sugar syrup | pounds per gallon of water | 20 |

1 coat applied.

| | | |
|---|---|---|
| Magnesium oxide | percent by wt | 80 |
| Starch | do | 20 |

Dusted on syrup.

3 to 4 coats of A applied.

| | | |
|---|---|---|
| B. Shellac (as free) | parts by wt | 6 |
| Ethyl alcohol (anhydrous denatured) | do | 6.7 |

1 coat applied over A above.

Example 5:

| | | |
|---|---|---|
| Beeswax | oz | 1 |
| Carnauba wax | oz | 2 |
| High grade light naphtha | gallons | 1 |

3 coats applied.

This list of pesticides, enteric coatings and outer water and saliva insoluble layers is not intended to be complete or restricted, but is an indication only of examples of killing agents and coatings operable in producing a pesticide of the defined characteristics.

The importance of a pesticide pellet comprising a nucleus of poison surrounded by an enteric coating and optionally an outer protective layer is immediately apparent when it is recognized that many of the poisons set forth above are not utilizable or are relatively ineffective in previously attempted processes of killing rodents, such failure being predicated upon various factors including extreme bitterness, the rodents becoming less susceptible after sub-lethal doses, and impracticality of using the same in their presently available form. For example, the use of yellow phosphorus has been completely impractical until the present invention, except in the form of an odorous, rapidly oxidizing paste, unless air is excluded, and inasmuch as the poisonous material contained in the instant pellet is completely enclosed by several coatings, phosphorus thus becomes an important rodenticide. By the same token, red squill is a very bitter poison, even in its less toxic form, and there is a great tendency for rat colonies, for example, to become shy to bait containing this type of killing agent, as many of the pests receive a sub-lethal dose. Also, strychnine alkaloid has not been utilized in the control of rats heretofore because of its intense bitterness that cannot be masked in any practical way so that the vermin cannot taste the same when they partake of a bait containing this alkaloid.

It is usually, although not necessarily, desirable to place an outer coating or layer around the enteric coating and completely enclose and seal the same in order to present a relatively water and saliva insoluble pellet which is not subject to dissolution under moist conditions and which might be deleterious to certain types of enteric coatings. The outermost coating should preferably be water insoluble as well as insoluble in saliva so that there is no tendency for such outer layer to dissolve in the mouth of the rodent, but will pass on into the stomach before breaking up and dissolving. An alternate outermost coating would be one which would not dissolve during progress of the pellet to the stomach but would dissolve in the conditions found therein. Some of the enteric coatings set forth in Table B above also have distinctive tastes and thus, if a larger than average pest of a given species receives a sub-lethal dose and becomes sick thereby, the outer layer enveloping the enteric coating prevents such pest from associating the distinctive taste of the enteric coating with the illness and thus preventing the development of a type of shyness, as described hereinabove. However, by providing a saliva insoluble layer on the outer surface of the enteric coating, the pellet digresses to the stomach of the pest without any taste association being set up and all possibility of taste shyness being developed is eliminated. Furthermore, utilization of the outer water and saliva insoluble layer prevents the formation of bait shyness because of the odor of the enteric coating or the poisonous principle.

The saliva insoluble layer over the enteric coating may be formed of many presently available well known substances utilized widely in the pharmaceutical and tablet coating industries, but the preferred material is edible shellac because of its time delay characteristics. In addition to the specific examples set forth in Table C, gum tragacanth may also be employed in forming the outer layer, as well as gelatin, various polysaccharides in the nature of starches and other suitable materials of similar properties. The outer layer should preferably be a material which either has no taste, or is not distasteful to the vermin, to avoid formation of a shyness association.

When an animal takes a bait containing pellets made in accordance with the above described method, the pellets, because of the water insoluble layer, pass initially into the stomach of the animal in substantially the same form as manufactured but, because of the acidic condition present in the stomach, the outer layer dissolves, thus exposing the enteric coating. The enteric coating does not dissolve in the stomach, but the pellet passes therefrom during the digestion process into the intestine with the remainder of the partially digested food taken in by the pest.

Upon passage of the pellet into the intestine, the alkaline environment causes the enteric coating to dissolve because of the change in pH, and the animal is exposed to the poisonous principle. Manifestly, several hours will elapse before the poison even begins to take effect and thus the instant pesticide is greatly improved over previously proposed products because of the fact that most of such prior poisons were relatively quick acting and an immediate effect was felt by the rodent from eating the poison bait. When a rat or the like took in such poisons that tended to act immediately, the animal became so ill in a short time that it refused to take any more poisoned bait before a lethal dose had been received. When the instant pesticide, however, is taken in by a rodent, the time delay between receipt and final killing effect is so long that the animal will continue to eat the bait for a time sufficient to receive lethal amounts of the poison and even will feed several times before any deleterious effects are apparent.

The pellets as set forth can be manufactured by any of the presently known methods for producing relatively small pills having a number of different or the same layers thereon and it is to be understood that the procedures employed in making pellets in accordance with this invention are common and well know in the industry. All of such well known methods as common to those versed in this art of producing coated tablets are contemplated hereby and utilizable.

With respect to the outermost coating, it has also been determined that the effectiveness of the bait is greatly increased by incorporating into or applying over the outermost, saliva insoluble coating, a rodent taste attractant which will cause the rodent to partake of the bait because of the attractive taste thereof and, inasmuch as sugar has the desired characteristic of rodent attraction, it is the most desirable substance to be incorporated in such outermost coating. Crude sugar is, of course, the most desirable type of taste attractant, although molasses might be incorporated as well as corn oil, sodium glutamate and other pest taste attractants.

Another facet of providing a rodent bait capable of attracting the pests would be to incorporate in the outermost coating an odoriferous agent which would cause the vermin to be attracted by the bait. Such odoriferous materials could be selected from the group consisting of corn oil, peanut oil, butyric acid, diacetyl, the odor constituent of bacon and other odor attractants.

Although it is a generally accepted fact that rodents do not have color vision, i.e., they are colorblind, there is some evidence that the color blue attracts the animals, even in complete darkness, and therefore, a blue dye or coloring, for example, methylene blue or ordinary vegetable color, may be placed in or on the outermost shellac or water insoluble coating to cause the rodents to be attracted to the bait. The blue color in the outermost coating has the additional function of being a safety factor, since it would be a warning to humans of the dangerous propensities of the material. Other colors, such as red and green, seem to have some attractant characteristics and these could be utilized.

In order for the instant pesticide product to be advantageously effective in the control of bird pests, it is desirable that the color on the outermost layer be of such nature as to be not unattractive to birds. Yellow and various shades of this color and combinations therewith have proven not to be unattractive to birds and would be the preferred color of the pellets when intended for use in the control and reduction of bird pests.

The preferred pesticide pellet of poison, enteric material and water and saliva insoluble, tasteless substance, has a nucleus of red squill of at least one $LD_{50}$ unit per 250 grams body weight of the pest, an enteric coating formed of approximately 25 coats of a composition consisting essentially of an admixture of, by weight, 8 parts of stearic acid, 6 parts of mutton tallow, 2 parts of balsam tolu and 1 part of 65% sodium taurocholate, and a final layer consisting of 2 coats of arsenic free shellac surrounding the enteric coating and having incorporated thereon or therein, crude sugar and corn oil, in conjunction with a sufficient quantity of methylene blue to color the outer layer. Furthermore, the finished pellet is preferably hard, spherical and of an appropriate size for the pest species involved, the preferred spherical body being approximately 0.03 inch in diameter when the pellet is to be utilized in the control of rats and mice.

In the production of a pesticide pellet of the third type initially described, an emetic substance is placed around the enteric coating in surrounding relationship thereto, in proportions to be hereinafter outlined, and which render the pellet safe for all types of mammals that are able to regurgitate. In this respect it is, of course, well known that rodents such as mice and rats are not capable of regurgitating because the sphincter at the base of the esophagus cannot open to allow passage of food out through the mouth. In other types of animals such as domestic pets, and humans, vomiting is possible and when such a mammal capable of emesing receives a tablet of the third type as described above, the emetic coating around the poisonous nucleus causes the animal to regurgitate the pellet, before any of the poisonous principle can cause deleterious effects of the receiving mammal. The useful dosage of an emetic in toxicological terminology is generally designated as an Effective Dose, and is determinable in terms commonly expressed as $ED_{50}$. Dosages available for or taken by an animal may be expressed as $ED_{50}$ units. Thus, 1 $ED_{50}$ unit will cause emesis in 50% of the animals which are subjected to the emetic. In order to render the presently defined pellet safe it is preferred that each of the pellets provided contain, for a given species, the ratio of at least 2 $ED_{50}$ units of an emetic for each $LD_{50}$ unit of poison available therein.

Many poisons and emetics are utilizable in producing a safe pesticide having the characteristics desired. Among the most important of these which are operable are the ones set forth in Table D wherein it can be seen that the desired amount of rodenticide per pellet is set forth as well as the amount of a particular emetic necessary to provide 2 $ED_{50}$ units of the emetic for each $LD_{50}$ unit of the rodenticide.

layer thereon to be operable in the control of bird pests, it is necessary that the emetic used in the pellets be one which is ineffective on birds, but which effectively causes emesis in humans and other animals such as domestic pets. Apomorphine, an emetic disclosed in Table D, is the preferred substance for use with bird poisons, although other such products could be substituted therefor.

Based on the toxic dose of the poison and the effective dose of the emetic there should be a ratio of these two ingredients such that any animal, regardless of size, will take in an effective dose of the emetic by or before the time that it receives a toxic dose of the poison. For example, a small animal will require only a small amount of poison to kill it, but likewise a small, correlated dose of emetic will be effective in causing emesis before a lethal dose of the poison is received. In this manner, the proportions of emetic and poison are governed so that the pellets are completely safe to all types of animals capable of regurgitation, but are effective against rodents and birds.

Again it is to be noted that a water and saliva insoluble, relatively tasteless outer layer may be placed over the emetic in completely enveloping relationship thereto. Reference is made to the examples in Table C for a disclosure of suitable materials and quantities thereof for utilization as the outer layer. The function of this outer layer has previously been described.

It is also to be understood that any one or all of the odoriferous materials, taste attractants and coloring agents disclosed above may be incorporated into the outer layer for the reasons set forth and as found desirable.

In certain examples specifically set forth above, the enteric coating may be eliminated between the poison

*Table D*

| | | Amount of Indicated Emetic per Pellet | | | | | | | |
|---|---|---|---|---|---|---|---|---|---|
| | Units of Pesticide per Pellet | Ipecac Fluid-extract, mg. | Emetine Hydro-chloride, mg. | Cephae-line, mg. | Lobelia Fluid-extract, mg. | Anti-mony-potas-sium tar-trate, mg. | Zinc sul-fate, mg. | Cupric sulfate, mg. | Apomor-phine, mg. |
| Pesticide: | | | | | | | | | |
| Arsenic trioxide ($As_2O_3$) | 6.25 mg. (½ $LD_{50}$ Unit) | 4 | 0.43 | 0.22 | 0.71 | 0.43 | 14.22 | 2.13 | 0.08 |
| Strychnine alkaloid | 2.5 mg. (1 $LD_{50}$ Unit) | 3.34 | .4 | .2 | .67 | .4 | 12.33 | 1.99 | .07 |
| Strychnine sulfate | 3.0 mg. (1 $LD_{50}$ Unit) | 3.34 | .4 | .2 | .67 | .4 | 12.33 | 1.99 | .07 |
| Sodium monofluoroacetate (1080) | 1.25 mg. (1 $LD_{50}$ Unit) | 8.34 | 1.0 | .5 | 1.67 | 1.0 | 33.33 | 5.0 | .17 |
| Red Squill ("Silmurine" brand) (27 mg./kg.) | 6.75 mg. (1 $LD_{50}$ Unit) | 3.34 | .4 | .2 | .67 | .4 | 12.33 | 1.99 | .07 |
| Red Squill (100 mg./kg.) | 6.25 mg. (¼ $LD_{50}$ Unit) | .84 | .1 | .05 | .17 | .1 | 3.09 | .5 | .02 |
| Alpha naphthyl thiourea (ANTU) | 2 mg. (1 $LD_{50}$ Unit) | 3.34 | .4 | .2 | .67 | .4 | 12.33 | 1.99 | .07 |
| "Castrix" (2-chloro, 4-dimethylamino, 6-dimethylamino, 6-methyl pyrimidine) | 0.65 mg. (1 $LD_{50}$ Unit) | 3.34 | .4 | .2 | .67 | .4 | 12.33 | 1.99 | .07 |
| DAS (p-dimethylaminobenzenediazo sodium sulfonate) | 3.75 mg. (1 $LD_{50}$ Unit) | 3.34 | .4 | .2 | .67 | .4 | 12.33 | 1.99 | .07 |
| Zinc phosphide ($Zn_3P_2$) | 10 mg. (1 $LD_{50}$ Unit) | 3.34 | .40 | .2 | .67 | .4 | 12.33 | 1.99 | .07 |
| Phosphorus (Yellow) | 2.5 mg. (1 $LD_{50}$ Unit) | 3.34 | .4 | .2 | .67 | .4 | 12.33 | 1.99 | .07 |
| Thallium sulphate (Thallous sulfate) $Tl_2SO_4$ | 6.25 mg. (1 $LD_{50}$ Unit) | 3.34 | .4 | .2 | .67 | .4 | 12.33 | 1.99 | .07 |
| Anticoagulant Rodenticide: | | | | | | | | | |
| Warfarin (3-(a-acetonylbenzyl)-4-hydroxy-coumarin) | 0.625 mg. (Daily dose for 1 $LD_{50}$ Unit in 3 to 5 days) | 5.56 | .67 | .34 | 1.12 | .67 | 22.23 | 3.34 | .12 |
| Coumachlor ("Tomorin," Geigy, Ltd.) | do | 5.56 | .67 | .34 | 1.12 | .67 | 22.23 | 3.34 | .12 |
| "Fumarin" (3-(Alpha-Acetonyl-furfuryl)-4-Hydroxy-coumarin) | do | 5.56 | .67 | .34 | 1.12 | .67 | 22.23 | 3.34 | .12 |
| "Pival" (2 Pivalyl -1, 3-Indandione) | do | 5.56 | .67 | .34 | 1.12 | .67 | 22.23 | 3.34 | .12 |
| Dicoumarol (3, 3-methylene-bis (4-hydroxy-coumarin)) | do | 5.56 | .67 | .34 | 1.12 | .67 | 22.23 | 3.34 | .12 |
| Diphacinone (2 diphenyl-1, 3 Indandione) | do | 5.56 | .67 | .34 | 1.12 | .67 | 22.23 | 3.34 | .12 |
| Calcium salt of 2-Iso-valeryl-1, 3-Indandione | do | 5.56 | .67 | .34 | 1.12 | .67 | 22.23 | 3.34 | .12 |

This list of pesticides and emetics is also not intended to be complete or restricted, but is an indication only of examples of killing agents operable in the instant invention.

In order for the pesticide product having an emetic and the emetic, particularly in instances where the emetic is relatively water insoluble, e.g., apomorphine.

The emetics set forth in Table D also have distinctive tastes in the manner of the rodenticides and thus, if a large rat received a sub-lethal dose and became sick thereby, it would not tend to associated the taste of the emetic with the illness, thus developing a type of shyness. However, by providing a saliva insoluble coating on the outer surface of the pellet, the pellet will digress to the stomach of the rodent without any taste association being set up and eliminating all possibility of taste, and odor shyness for that matter.

The preferred pesticide pellet having an emetic layer includes a nucleus of red squill of at least 1 $LD_{50}$ unit per 250 grams body weight of the rodent, an intermediate coating of high melting esters of fatty acids or mixtures thereof of sufficient thickness that the pellet will pass from the stomach to the intestine of the animal before the poisonous principle is exposed, an emetic coating of ipecac fluid extract of sufficient proportions that there is provided at least 2 $ED_{50}$ units of emetic for each $LD_{50}$ unit of poison, and a final coating of shellac around the emetic of sufficient thickness having incorporated thereon sugar and corn oil, in conjunction with methylene blue.

It is apparent that by modification of the active ingredients and coatings, and the number of relative positions of the various layers provided on the pellet, the basic idea of the minute pesticide with external protective coatings can be adapted to additional uses not heretofore found practical. For example, by appropriate modifications, a pesticide might be provided which would be highly selective and active only as an avicide, thallium sulphate having this property. By the same token, a pellet having suitable ingredients therein might be provided to gradually release a herbicide over a prolonged period of time, or to gradually release a root absorbing systemic insecticide for plants, or even provide extended release of plant nutrients or fertilizers over a lengthy period, and even by modification of the active ingredients, coatings and size of the pellet provide a prolonged, gradual release or appropriately timed mass release of toxic ingredients which will kill internal parasites of animals or blood sucking external parasites. By providing different types of economic poisons in the nucleus or in the layers or by modification of the layers, a safe pesticide might be provided which would be effective in the control of certain insects such as the common house fly, blowfly, silverfish, cockroach, grasshoppers, ants and crickets. Other variations of the technique might make it useful in control of stored product insects such as the sawtoothed grain beetle, confused flour beetle and the hump beetle.

This is a continuation-in-part of my application Serial No. 643,555, filed March 4, 1957, and entitled "Pesticide."

Having thus described the invention what is claimed as new and desired to be secured by Letters Patent is:

1. A pesticide comprising a laminated, self-sustaining body including an internal nucleus containing a predetermined lethal quantity of an economic poison and provided with an enteric coating completely enveloping said nucleus to prevent release of the poison to the pest upon ingestion of the body until after the latter has passed through the pest's stomach to its intestine, said body being of a size to allow the pest to gulp the body without chewing or fracturing said coating.

2. A pesticide comprising a laminated, self-sustaining body including an internal nucleus containing a predetermined lethal quantity of an economic poison and provided with an enteric coating completely enveloping said nucleus of the type characterized by the property of resisting dissolution to release the poison to the pest upon ingestion of the body for a period of at least approximately four hours under gastric conditions, said body being of a size to allow the pest to gulp the body without chewing or fracturing said coating.

3. A pesticide comprising a laminated, self-sustaining body including an internal nucleus containing a predetermined lethal quantity of an economic poison, provided with an enteric coating completely enveloping said nucleus to prevent release of the poison to the pest upon ingestion of the body until after the latter has passed through the pest's stomach to its intestine, and a substantially water and saliva insoluble outer layer enclosing said coating, said body being of a size to allow the pest to gulp the body without chewing or fracturing the layer.

4. A pesticide as set forth in claim 3 wherein said outer layer is colored with material of a selected distinguishing color.

5. A pesticide as set forth in claim 3 wherein said outer layer is odorized with a substance having a pest attractant odor.

6. A pesticide as set forth in claim 3 wherein said outer coating is flavorized with a pest attracting agent.

7. A pesticide as set forth in claim 3 wherein said outer layer is colored with material of a selected distinguishing color, odorized with a substance having a pest attractant odor and flavorized with a pest attractant agent.

8. A pesticide as set forth in claim 3 wherein said body is approximately spherical in configuration and of a size to pass through a screen within the range of approximately 16 to 20 mesh inclusive.

9. A pesticide comprising a laminated, self-sustaining body including an internal nucleus containing at least one $LD_{50}$ unit of an economic poison, provided with an enteric coating completely enveloping the nucleus to prevent release of the poison to the pest upon ingestion of the body until after the latter has passed through the pest's stomach to its intestine, and having a substantially water and saliva insoluble, relatively tasteless outer layer enclosing said coating, said body being of a size to allow the pest to gulp the body without chewing or fracturing the layer.

10. The method of killing vertebrate type pests comprising causing such pests to ingest a laminated, self-sustaining body including an internal nucleus containing a predetermined lethal dose of an economic poison and provided with an enteric coating completely enveloping said nucleus to prevent release of the poison until after the body has passed through the pest's stomach into its intestine, said body being of a size to allow the pest to gulp the body without chewing or fracturing said coating.

11. The method of killing vertebrate type pests comprising causing such pests to ingest a laminated, self-sustaining body including an internal nucleus containing at least one $LD_{50}$ unit of an economic poison, provided with an enteric coating completely enveloping the nucleus to prevent release of the poison until after the body has passed through the pest's stomach into its intestine, and having a substantially water and saliva insoluble, relatively tasteless outer layer enclosing said coating, said body being of a size to allow the pest to gulp the body without chewing or fracturing the layer.

12. A rodenticide comprising a laminated, self-sustaining body including an internal nucleus containing a quantity of an economic poison and provided with a layer completely enveloping said nucleus and containing a portion of an emetic, the ratio of emetic to poison being such that there is at least approximately one effective dose unit of emetic for each lethal dose unit of poison, said body being of a size to allow the rodent to gulp the body without chewing or fracturing said coating.

13. A rodenticide comprising a laminated, self-sustaining body including an internal nucleus containing a quantity of an economic poison, an enteric coating completely enveloping the poison and a layer surrounding said enteric coating and containing a proportion of an emetic, the ratio of emetic to poison being such that there is at least approximately one effective dose unit of emetic for each lethal dose unit of poison, said body being of a size to allow the rodent to gulp the body without chewing or fracturing said coating.

14. A rodenticide comprising a laminated, self-sustaining body including an internal nucleus containing a quantity of an economic poison, an enteric coating completely enveloping the poison, a layer surrounding said enteric coating and containing a proportion of an emetic and an outer coating enclosing said layer, the ratio of emetic to poison being such that there is at least approximately one effective dose unit of emetic for each lethal dose unit of poison.

15. A rodenticide as set forth in claim 14 wherein said outer coating is colored with a distinguishing color.

16. A rodenticide as set forth in claim 14 wherein said outer coating is odorized with a pest attractant odor.

17. A rodenticide as set forth in claim 14 wherein said outer coating is flavorized with a pest taste attractant agent.

18. A rodenticide as set forth in claim 14 wherein said outer coating is colored with a distinguishing color, odorized with a pest attractant odor and flavorized with a pest taste attracting agent.

19. A rodenticide as set forth in claim 14 wherein said outer coating is water and saliva insoluble.

20. A rodenticide as set forth in claim 14 wherein said body is approximately spherical in configuration and of a size to pass through a screen within the range of approximately 16 to 20 mesh inclusive.

21. A rodenticide comprising a laminated, self-sustaining body including an internal nucleus containing a quantity of an economic poison, an enteric coating completely enveloping the poison, a layer surrounding said enteric coating and containing a proportion of an emetic and an outer coating enclosing said layer, the ratio of emetic to poison being such that there are at least approximately 2 $ED_{50}$ units of emetic for each $LD_{50}$ unit of poison, said body being of a size to allow the rodent to gulp the body without chewing or fracturing said coating.

22. The method of killing rodents comprising causing such rodents to ingest a laminated, self-sustaining body including an internal nucleus containing a quantity of an economic poison and provided with a layer completely enveloping said nucleus and containing a proportion of an emetic, the ratio of emetic to poison being such that there is at least approximately one effective dose unit of emetic for each lethal does unit of poison, said body being of a size to allow the rodent to gulp the body without chewing or fracturing said layer.

23. The method of killing rodents comprising causing such rodents to ingest a laminated, self-sustaining body including an internal nucleus containing a quantity of an economic poison, an enteric coating completely enveloping the poison and a layer surrounding said enteric coating and containing a proportion of an emetic, the ratio of emetic to poison being such that there is at least approximately one effective dose unit of emetic for each lethal dose unit of poison, said body being of a size to allow the rodent to gulp the body without chewing or fracturing said layer.

24. The method of killing rodents comprising causing such rodents to ingest a laminated, self-sustaining body including an internal nucleus containing a quantity of an economic poison, an enteric coating completely enveloping the poison, a layer surrounding said enteric coating and containing a proportion of an emetic and an outer coating enclosing said layer, the ratio of emetic to poison being such that there is at least approximately one effective dose unit of emetic for each lethal dose unit of poison, said body being of a size to allow the rodent to gulp the body without chewing or fracturing said layer.

References Cited in the file of this patent

UNITED STATES PATENTS

| | | |
|---|---|---|
| 962,886 | Bolduan et al. | June 28, 1910 |
| 2,736,682 | Hermelin | Feb. 28, 1956 |
| 2,813,058 | Smith | Nov. 12, 1957 |

OTHER REFERENCES

Clarkson: "Tablet Coating," pp. 7, 8, and 55–64, 1951.
Miskimon et al.: "A Method for the Prevention of Suicidal Deaths Caused by the Barbituric Acid Derivatives," Va. Med. Monthly, March 1950.
Science News Letter, April 25, 1953, p. 259.
Virginia Med. Monthly, March 1950, pp. 119–122.